US012660809B2

(12) United States Patent
Huang

(10) Patent No.: US 12,660,809 B2
(45) Date of Patent: Jun. 23, 2026

(54) BIONIC BIRD REPELLER

(71) Applicant: Weifang Qiaoliang Craft Gifts Co., Ltd, Shandong (CN)

(72) Inventor: Gui Huang, Shandong (CN)

( * ) Notice: Subject to any disclaimer, the term of this patent is extended or adjusted under 35 U.S.C. 154(b) by 0 days.

(21) Appl. No.: 18/788,181

(22) Filed: Jul. 30, 2024

(65) Prior Publication Data

US 2026/0033483 A1 Feb. 5, 2026

(51) Int. Cl.
*A01M 29/06* (2011.01)

(52) U.S. Cl.
CPC .................................... *A01M 29/06* (2013.01)

(58) Field of Classification Search
CPC .............................. A01M 29/06; A63H 27/08
USPC ........................................................ D21/445
See application file for complete search history.

(56) References Cited

U.S. PATENT DOCUMENTS

| 984,295 A * | 2/1911 | Peuvot ................... | A63H 27/08 |
| | | | 244/154 |
| 3,951,363 A * | 4/1976 | Grauel ................... | A63H 27/08 |
| | | | 244/153 R |
| 4,099,690 A * | 7/1978 | Mendelsohn .......... | A63H 27/08 |
| | | | 244/153 R |
| 5,956,880 A * | 9/1999 | Sugimoto ............. | A01M 29/06 |
| | | | 116/22 A |
| 2003/0111578 A1* | 6/2003 | Ito .......................... | A63H 27/08 |
| | | | 244/153 R |
| 2003/0121198 A1* | 7/2003 | Watermann ........... | A01M 29/06 |
| | | | 43/1 |
| 2013/0061817 A1* | 3/2013 | Matzel .................. | A01M 29/06 |
| | | | 119/712 |
| 2017/0347641 A1* | 12/2017 | Giangrasso ........... | A01M 29/06 |

FOREIGN PATENT DOCUMENTS

EP 0985345 A1 * 3/2000 ............ A01M 29/06

* cited by examiner

*Primary Examiner* — Joshua J Michener
*Assistant Examiner* — Nicole Paige MacCrate
(74) *Attorney, Agent, or Firm* — Hawaii Patent Services; Nathaniel K. Fedde; Kenton N. Fedde

(57) ABSTRACT

A bionic bird repeller comprises a pole, a connecting rope, a connecting element and a raptor kite, wherein the raptor kite comprises wing parts, a tail part and a chest part, at least one pair of wing parts are provided with concave parts, a first air duct is formed inside the concave part, and a diversion structure is arranged on the chest part, and a second air duct is formed between the diversion structure and the tail part; the connecting element is used for connecting the raptor kite and the connecting rope, and the connecting element comprises a movable mechanism for preventing twisting.

18 Claims, 12 Drawing Sheets

BIONIC BIRD REPELLER

TECHNICAL FIELD

The present invention relates to the technical field of bird repellers, in particular to a bionic bird repeller.

BACKGROUND

In some places, such as farmland, gardens, roofs, ships, etc., economic losses are often caused by bird interference, so it is necessary to set up a bird repeller to prevent birds from approaching. At present, a bird repeller has appeared. Its principle is to insert a slender pole on the ground, tie a connecting rope at the top of the pole, and tie an eagle-shaped kite on the connecting rope. The eagle kite floats in the air under the action of wind, so that ordinary birds are afraid to approach, thus achieving the bird repelling effect.

However, when the existing bird repelling device is used, the flight path of the eagle kite is fixed, or even kept in the same position for a long time, which makes the eagle kite dull and lifeless, affecting the bird repelling effect; And when the eagle kite changes its position with the wind, the rope is easy to get entangled and twisted.

Therefore, there is a need to propose a new bionic bird repeller. The eagle kite of this new bionic bird repeller can fly more flexibly, the flight trajectory is more vivid and realistic, and it can also avoid being entangled with the rope during the flight of the eagle model.

SUMMARY

The present invention provides a bionic bird repeller to solve that problem that an eagle model propose in the background art is easy to be entangled with a rope in the flight process.

In order to achieve the above purpose, the present invention adopts the following part technical solutions.

The present invention provides a bionic bird repeller, which includes a pole, a connecting rope, a connecting element and a raptor kite, wherein, the raptor kite comprises wing parts, a tail part and a chest part, wherein there are at least one pair of wing parts which are provided with concave parts; a first air duct is formed inside the concave part; and the chest part is provided with a diversion structure, and a second air duct is formed between the diversion structure and the tail part;

the connecting element is used for connecting the raptor kite and the connecting rope, and the connecting element comprises a movable mechanism for preventing twisting; and one end of the connecting rope is connected to the pole, a rotating mechanism is arranged between the pole and the connecting rope, and the raptor kite rotates around the pole by 360 degrees through the rotating mechanism.

The present invention further provides a bionic bird repeller, which includes a pole, a connecting rope, a connecting element and a raptor kite, wherein, the raptor kite comprises wing parts, a tail part and a chest part, wherein there are at least a pair of wing parts which are provided with concave parts, and an inner side of the concave part forms a first air duct, and the chest part is provided with at least two parallel diversion sheets;

the connecting element is used for connecting the raptor kite and the connecting rope, and comprises a movable mechanism for preventing twisting, wherein the movable mechanism comprises a rotating drum and a rotating core, and the rotating core is rotatably connected in the rotating drum;

one end of the connecting rope is connected to the pole, a rotating mechanism is arranged between the pole and the connecting rope, and the raptor kite rotates around the pole by 360 degrees through the rotating mechanism.

Figure 1:
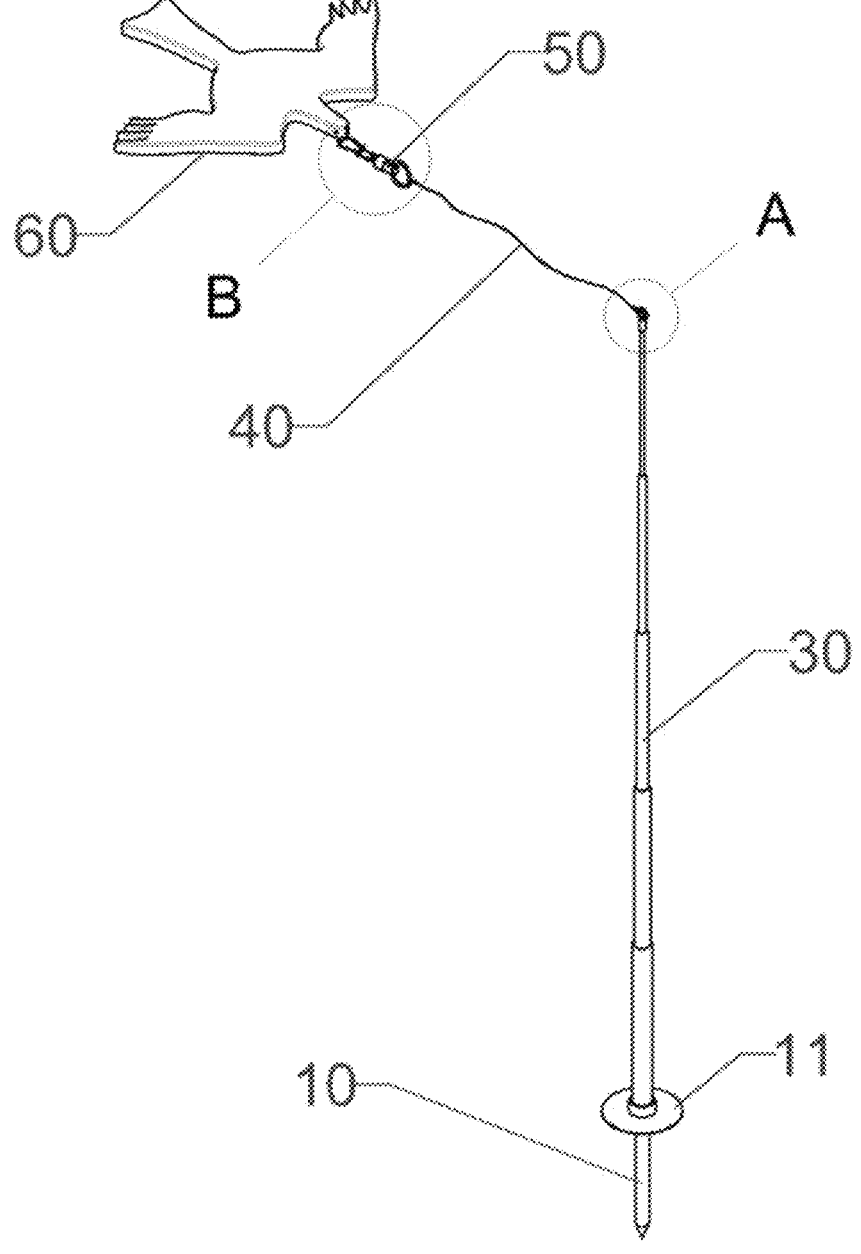
FIG. 1 is a structural schematic diagram of a first embodiment of the present invention.
Figure 2:
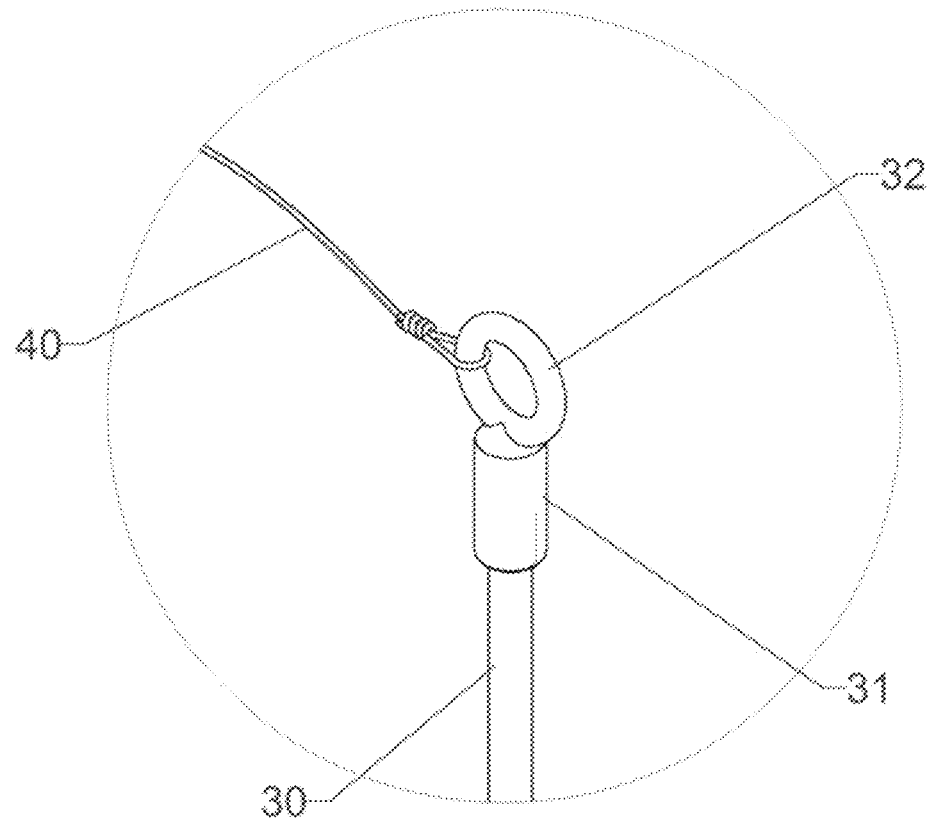
FIG. 2 is a partially enlarged schematic view at A of FIG. 1 of the present invention.

Reference signs: Thorn cone (10); Support plate (11); Mounting base (20); Bottom plate (21); Socket (22); Rotating shaft (221); Mounting bolt (23); Fastening screw (24); Bearing (25); Assembly cavity (26); Blocking plate (27); Pole (30); Sleeve (31); First collar (32); Connecting rope (40); Connecting element (50); Second collar (51); Rotating drum (52); Rotating core (53); Retaining ring (54); Raptor kite (60); Wing (61); Concave part (611); Tail part (62); Chest part (63); Diversion sheet (631).

DESCRIPTION OF EMBODIMENTS

Embodiment 1

Please refer to FIGS. 1 to 3 and 9 to 12;

the present invention provides a bionic bird repeller, which includes a pole 30, a connecting rope 40, a connecting element 50 and a raptor kite 60, wherein, the raptor kite 60 comprises wing parts 61, a tail part 62 and a chest part 63, wherein there are at least one pair of wing parts 61 which are provided with concave parts 611; a first air duct is formed inside the concave part 611; and the chest part 63 is provided with a diversion structure, and a second air duct is formed between the diversion structure and the tail part 62.

As shown in FIG. 9 to FIG. 12, in this embodiment, the diversion structure includes at least two diversion sheets 631 arranged in parallel, and the tail part 62 is located behind between the two diversion sheets 631. The pair of wing parts 61 are symmetrically arranged left and right, so that a flying lift can be provided during the flight of the raptor kite 60. The concave part 611 is provided on the leeward side of the wing part 61. However, by arranging the concave parts 611 on the wing part 61, when the raptor kite 60 flies, both concave parts 611 can form a first air duct.

At the same time, when the raptor kite 60 flies, the two deflector pieces 631 can gather and guide the front wind to the tail part 62, thus forming a second air duct.

Figure 12:
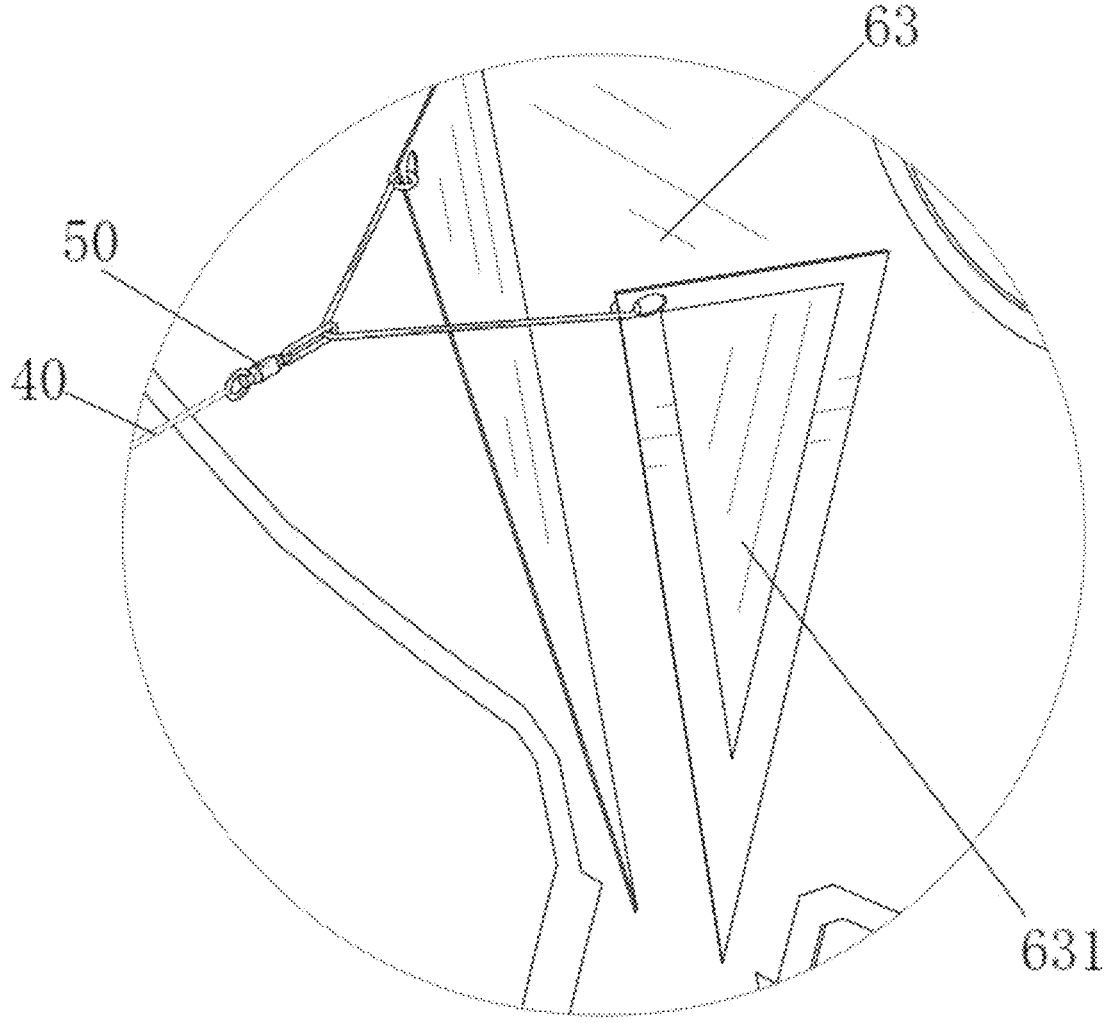
FIG. 12 is a partially enlarged schematic view at C in FIG. 10 of the present invention.
Figure 13:
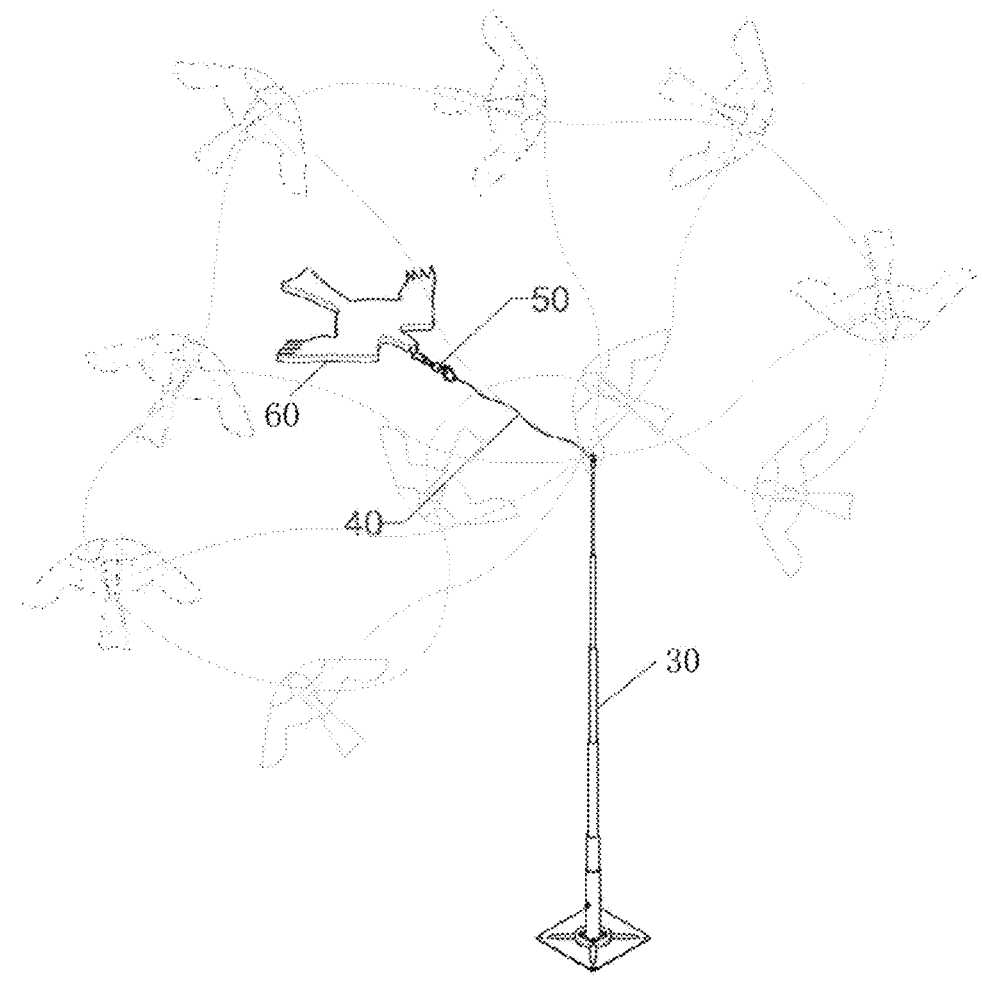
FIG. 13 is a flight trajectory diagram of a raptor kite according to the present invention.

Therefore, through the cooperation of the first air duct and the second air duct on the left and right sides of the raptor Kite 60, the flight trajectory of the raptor kite 60 can be changed irregularly during the flight, as shown in FIG. 12. Therefore, through this irregular flight mode, the raptor kite 60 can fly more naturally and realistically, thus improving the threatening effect on other birds.

Moreover, by adopting this multi-air duct structure, the wind resistance of the raptor kite 60 can be reduced, and the service life of the raptor kite 60 can be prolonged.

According to the above, the connecting element 50 is used to connect the raptor kite 60 with the connecting rope 40, and the connecting element 50 includes a movable mechanism for preventing twisting.

By arrange that movable mechanism, the raptor kite 60 can move with the connecting rope 40 dure the flight of the raptor kite 60, so that the connecting rope 40 can not be twisted.

Figure 3:
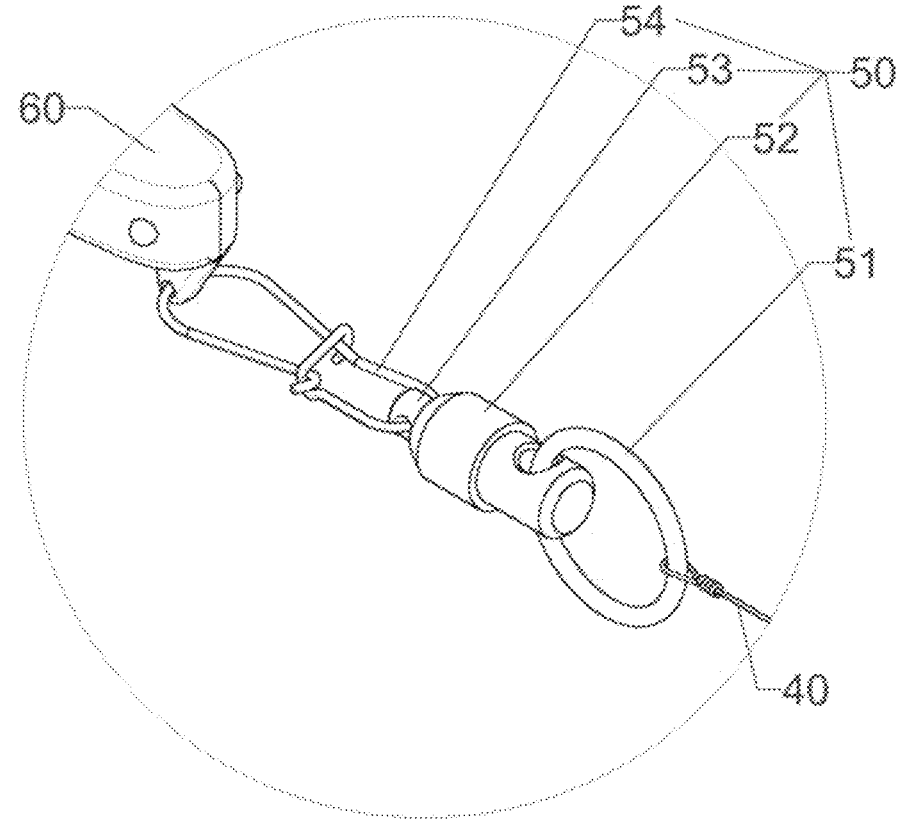
FIG. 3 is a partially enlarged schematic view at B of FIG. 1 according to the present invention.

Specifically, as shown in FIG. 3, in this embodiment, the movable mechanism comprises a second collar 51, a rotating drum 52, a rotating core 53 and a retaining ring 54, wherein the rotating drum 52 is sleeved on the second collar 51, the rotating core 53 is rotatably connected in the rotating drum 52, and the retaining ring 54 is movably connected to the rotating core 53, wherein two diversion sheets 631 are connected with the retaining ring 54, and the other end of the connecting rope 40 is tied to the second collar 51. During the flight of the raptor kite 60, the rotating core 53 can rotate in the rotating drum 52, so that the connecting rope 40 can be prevented from being twisted in this way.

Figure 11:
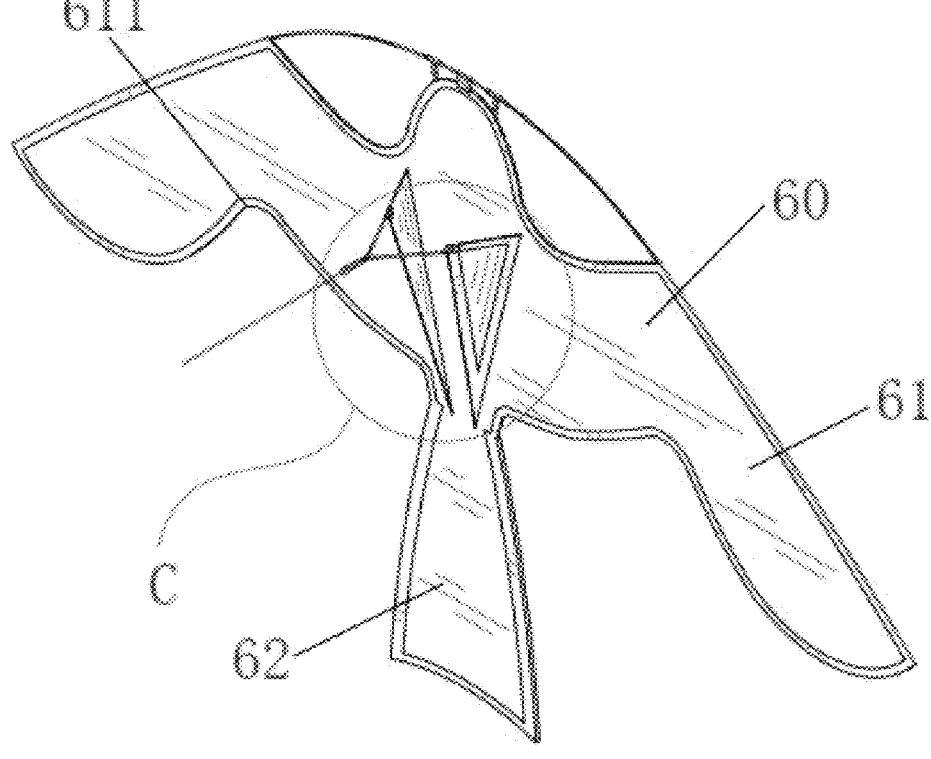
FIG. 11 is a schematic structural view of the raptor kite of the present invention from another angle.

In this embodiment, a rope is connected between the two diversion sheets 631, and the retaining ring 54 is buckled outside the rope, so that the connecting element 50 can be connected with the raptor kite 60. In this way, when the Raptor Kite 60 flies, the two diversion sheets 631 will be straightened, as shown in FIG. 11, so that the two diversion sheets 631 can be connected with the connecting rope 40, and at the same time, the two diversion sheets 631 can be kept in a straight state, thus guiding the air.

The retaining ring 54 is movably connected to the rotating core 53. Because the retaining ring 54 is a fastener made by bending and closing a metal strip, both ends of the retaining ring 54 are respectively buckled on its body by its own elasticity, and the retaining ring 54 is hooked on the raptor kite 60, it is convenient to connect and disassemble the connecting element 50 with the raptor kite 60. Moreover, because both ends of the connecting element 50 can rotate 360 degrees, the raptor kite 60 can be turned freely, and its flight performance is greatly improved. Moreover, all components in the connecting element 50 are made of metal materials and have certain rigidity, therefore they are not easy to bend. Further, the connecting piece 50 is used to connect between the connecting rope 40 and the raptor kite 60, and the raptor kite 60 is separated from the connecting rope 40 by a certain distance, so that the connecting rope 40 and the raptor kite 60 can be better prevented from being twisted, and the raptor kite 60 can be ensured to maintain a smooth flight path and an optimal flight state.

By connecting one end of the connecting rope 40 to the pole 30, a rotating mechanism is arranged between the pole 30 and the connecting rope 40. So that the raptor kite 60 rotates 360 degrees around the pole 30 through the rotating mechanism.

Specifically, the rotating mechanism comprises a sleeve 31 and a first collar 32, wherein the sleeve 31 is rotatably connected to the top of the pole 30; the first collar 32 is fixedly installed on the top of the sleeve 31; and the connecting rope 40 is bound to the first collar 32. The sleeve 31 can rotate 360 degrees along the pole 30, so as to prevent the connecting rope 40 from winding on the pole 30 during the flight of the raptor kite 60. At the same time, it also makes the raptor kite 60 fly more naturally and has a wider flight range.

In this embodiment, the pole 30 is a telescopic pole composed of a plurality of short poles which are sequentially sleeved, so that the pole 30 can be extended and retracted, and it is convenient to place the raptor kite 60 at different heights. Moreover, in this embodiment, the pole 30 is made of high-toughness materials, such as carbon fiber materials, resin fiber materials, etc., which can greatly improve the toughness of the pole 30, so that the pole 30 has excellent resilience and is not easy to be broken or deformed, thereby improving the service life of the pole 30.

In other embodiment, the pole 30 is not limited to the traditional telescopic structure, and any structure that can flexibly adjust the length can be applied to the present invention. For example, the sleeve structure that can be extended by precise thread adjustment, and the short rod design that can be quickly locked by using the stable buckle mechanism, etc.

While when facing different application scenarios and actual conditions, the pole 30 can be made of different materials. Stainless steel can be used to make the pole 30 in the harsh environment such as humidity and salt fog, so as to improve the corrosion resistance of the pole 30 and ensure the service life and stability of the bird repellent. In areas with bad wind conditions, carbon fibers with high toughness and light weight can also be used to prevent the pole 30 from being damaged by bad wind.

By setting the thorn cone 10, when deploying the bionic bird repeller, firstly, the thorn cone 10 needs to be firmly inserted into the ground as a support point to make the pole 30 stand vertically. The support plate 11 is arranged at the top end of the pricker cone 10, and the support plate 31 can be closely attached to the ground after the pricker cone 10 is inserted into the ground, thus providing a solid base for the pole 30 and effectively preventing the lodging phenomenon caused by wind or external force. Subsequently, the raptor kite 60 floats freely in the air driven by the natural wind, and its irregular flight trajectory accurately simulates the soaring state of the Raptor. In particular, the Raptor kite 60 adopted in this embodiment is designed based on the eagle, which makes full use of the natural fear of ordinary birds to force them to keep a safe distance, thus achieving an efficient bird repellent effect.

In other embodiments, the raptor kite 60 can also be set as a bird of prey that other birds are afraid of according to the actual situation of the local biological environment, and is not limited to the single species of eagle.

The thorn cone 10 is not limited to the straight bar structure in this embodiment, but can also be adjusted and applied according to the unique geological conditions and soil characteristics of each region.

For example, in other embodiments (not shown in the figure), the straight thorn cone 10 can be replaced by a spiral curved thorn cone 10, or a spiral blade is arranged outside the thorn cone 10. In this way, in areas with high water content, such as swamps or wetlands, the soil is soft and easy to sink, and it may be difficult for the traditional thorn cone 10 to maintain stability for a long time. However, the spiral curved thorn cone 10 or the thorn cone 10 with spiral blades can gradually penetrate into the soil layer while keeping the soil structure relatively intact, providing a reliable supporting foundation for the device and ensuring the safe operation of the equipment.

In addition, the structure of a multi-spike thorn cone 10 (not shown in the figure) can also be adopted, that is, a plurality of small spikes are designed around the thorn cone 10. Therefore, when the barbed cone 10 is inserted into the soft soil, these small tips can play the role of barbs, and increase the contact area with the soil to form multi-point support and enhance the overall stability.

To sum up, when the thorn cone 10 is applied to other areas, it can be flexibly adjusted and applied according to local specific geological conditions and soil characteristics to ensure the stability and reliability of the device in various complex environments.

In other embodiments (not shown in the figure), the support plate 11 can also be adjusted according to the actual conditions of the application scene. For example, in the soft wetland, the support plate 11 can adopt a structure in which a plurality of thin nails are arranged on its lower surface and inserted into the soil to improve the support stability, thus ensuring the stability of the pole 30.

In this embodiment, the connecting rope 40 is preferably made of high-quality nylon material, which has excellent wear resistance and aging resistance, thus ensuring the stability and reliability of the connecting rope 40 under long-term use. In addition, the nylon rope also has excellent load-bearing capacity, which can easily bear more than 50 Kg of tensile force, fully meeting the use requirements of bird repeller in different weather and wind conditions.

In other embodiments (not shown in the figure), the connecting rope 40 can be made of a series of flexible materials meeting strict strength standards, including but not limited to high-strength polyester fiber, nylon braided rope and aramid fiber rope specially designed for extreme environment. According to the local wind conditions, appropriate materials are selected to ensure that the connecting rope 40 can still maintain excellent bearing capacity and stability in extreme weather.

For example, in coastal areas with abundant wind resources, aramid fiber rope is used as the material of connecting rope 40, which can effectively resist sea breeze erosion and strong wind impact because of its extremely high tensile strength, wear resistance and corrosion resistance. However, in inland plains and other areas where the wind is relatively mild, high-strength polyester fiber or nylon braided rope can be a more preferred embodiment because of its cost-effectiveness and good comprehensive performance.

In addition, the specific specifications and length of the connecting rope 40 can also be finely adjusted according to the actual situation on site, so as to ensure that it not only meets the structural requirements of the equipment, but also maximizes the use of wind energy resources and achieves efficient and stable operation effects.

In other embodiments (not shown in the figure), the sleeve 31 can adopt the structure of ball joint bearing, which can realize unlimited rotational freedom in three-dimensional space and cope with complex and unpredictable wind direction changes in nature with unparalleled flexibility. Ball joint bearing has excellent bearing capacity and low friction characteristics. It can not only maintain the stability and durability of the structure under high stress environment, but also significantly reduce the dynamic impact and wear on the connecting rope 40 by reducing the friction resistance during rotation, thus prolonging the service life of the whole device.

In other embodiments (not shown in the figure), the first collar 32 can also be arranged in the form of a carabiner, so that the first collar 32 has a gap that can be opened and closed, thereby facilitating the connection rope 40 to be sleeved in the first collar 32, and realizing the purpose of quick connection and disassembly.

Embodiment 2

Figure 4:
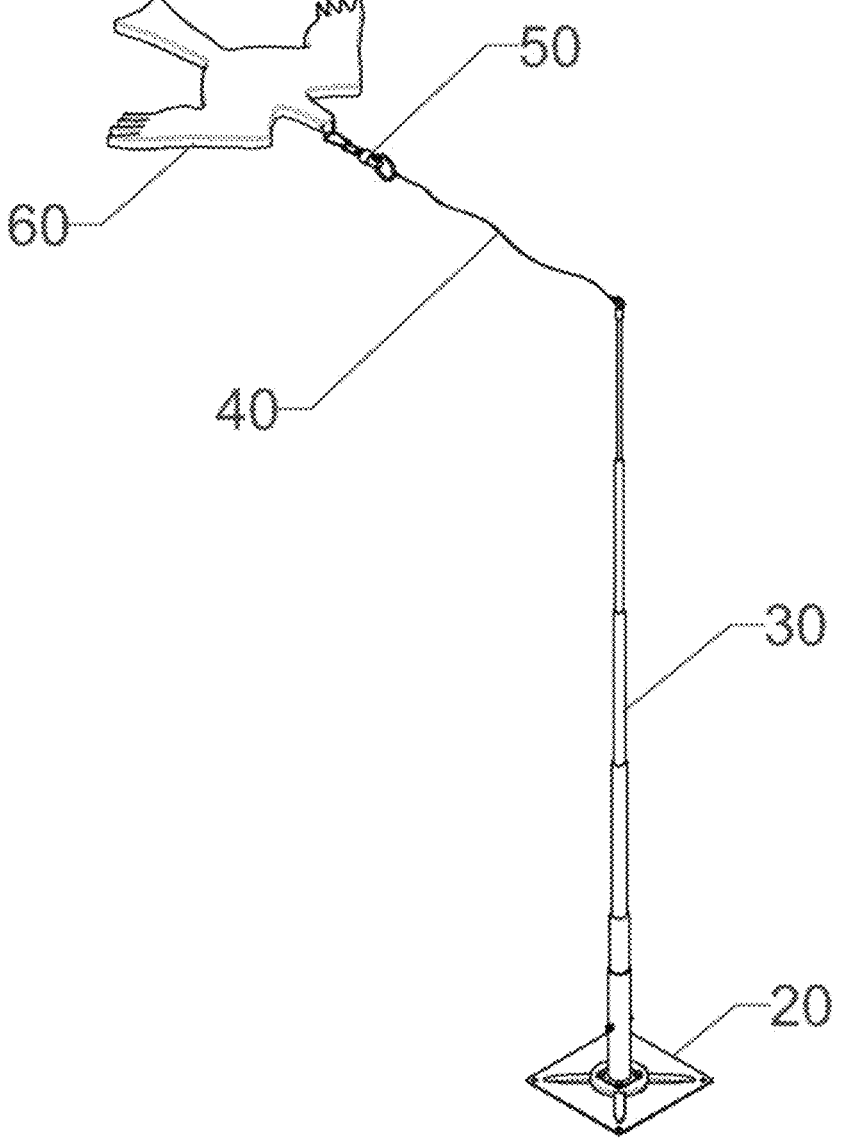
FIG. 4 is a structural schematic diagram of a second embodiment of the present invention.
Figure 5:
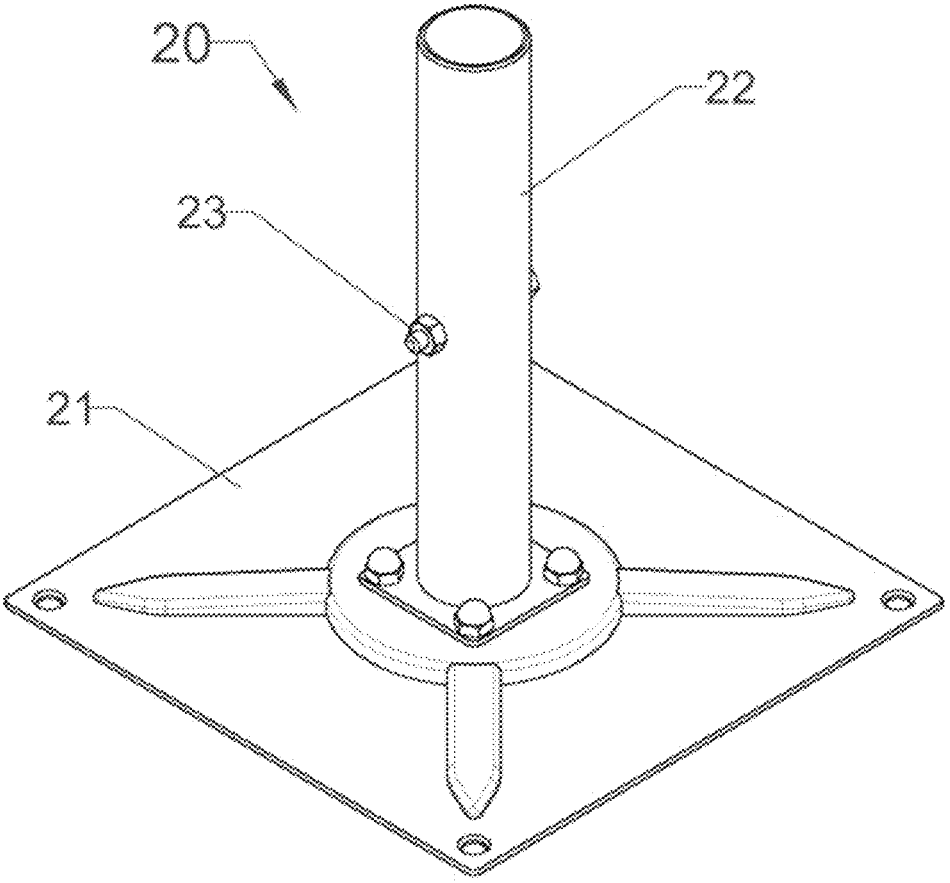
FIG. 5 is a schematic structural view of the mounting base of FIG. 4 according to the present invention.
Figure 6:
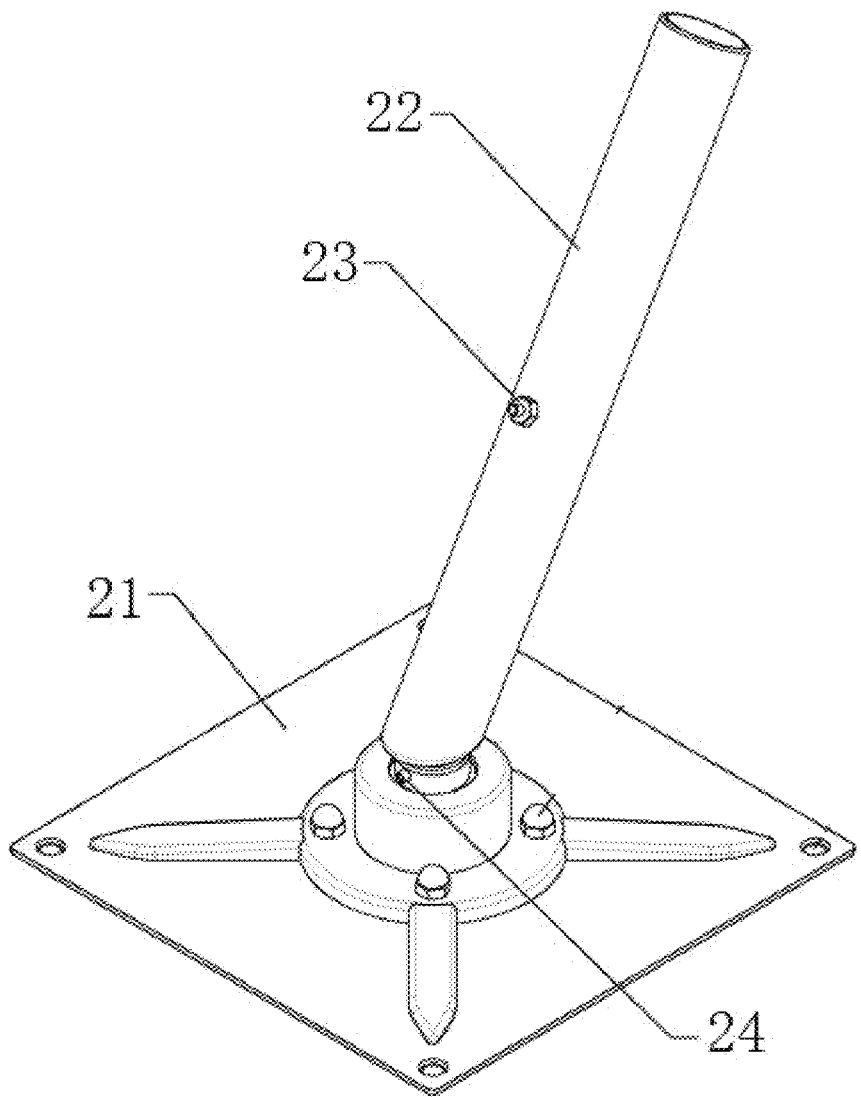
FIG. 6 is a schematic structural view of the third embodiment of the fixing device of the present invention.
Figure 7:
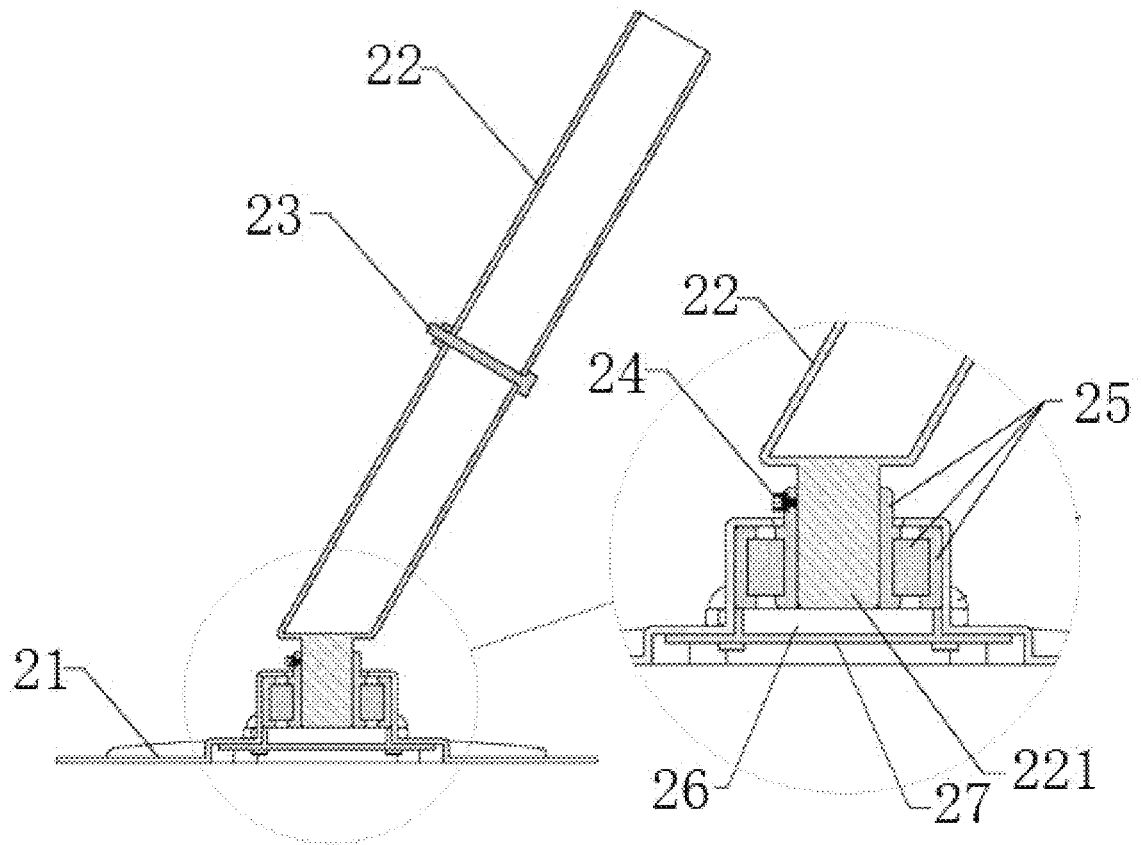
FIG. 7 is a sectional view of a third embodiment of the fixing device of the present invention.
Figure 8:
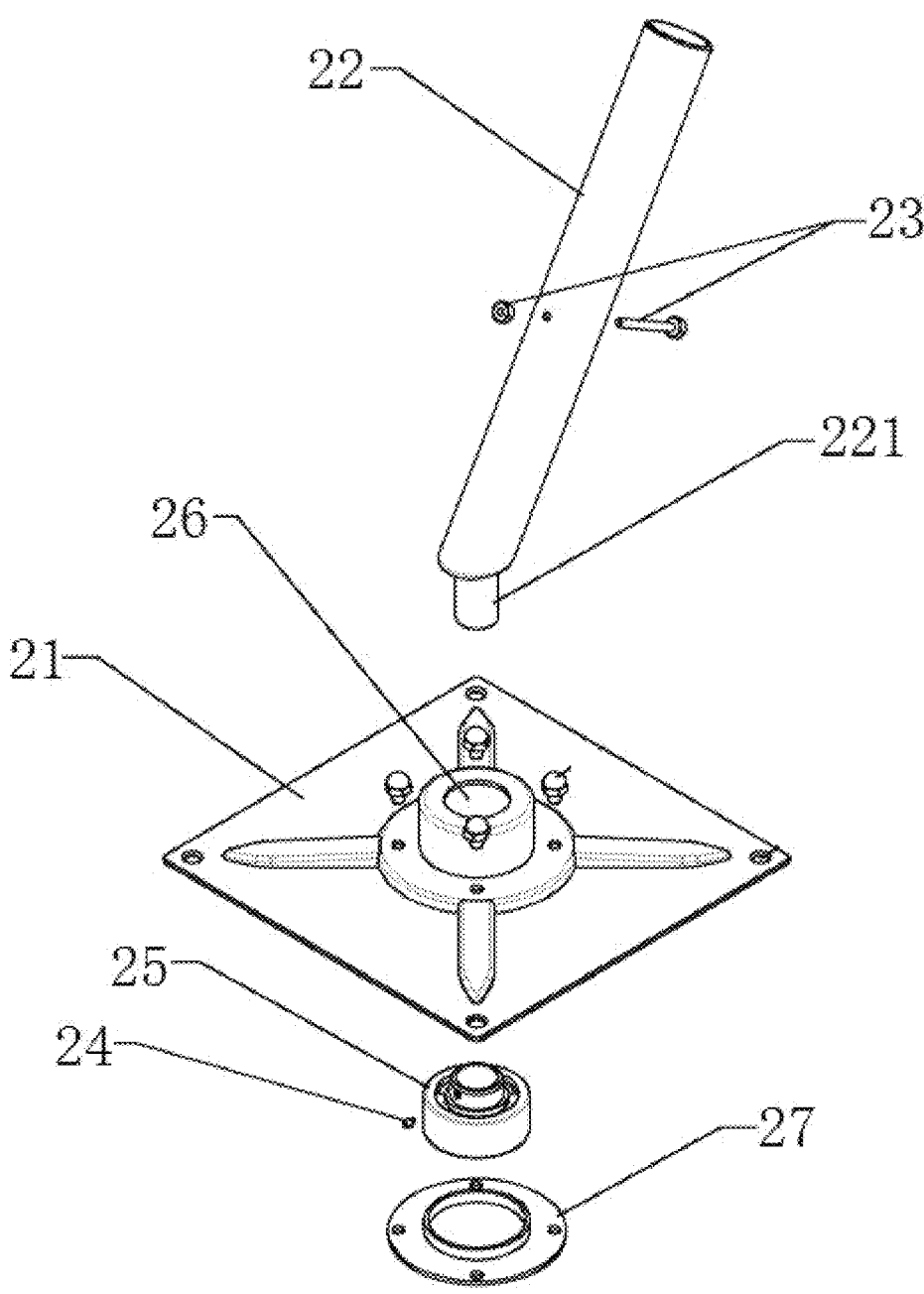
FIG. 8 is an exploded view of the third embodiment of the fixing device of the present invention.
Figure 9:
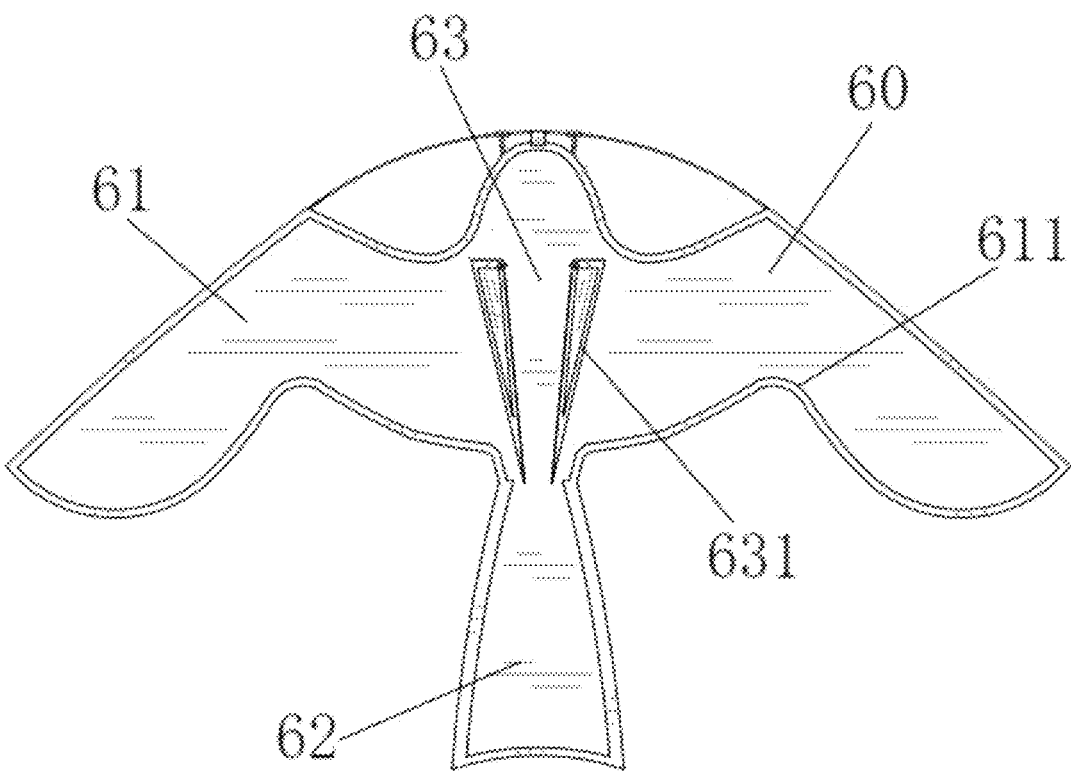
FIG. 9 is a schematic structural diagram of a raptor kite according to the present invention.
Figure 10:
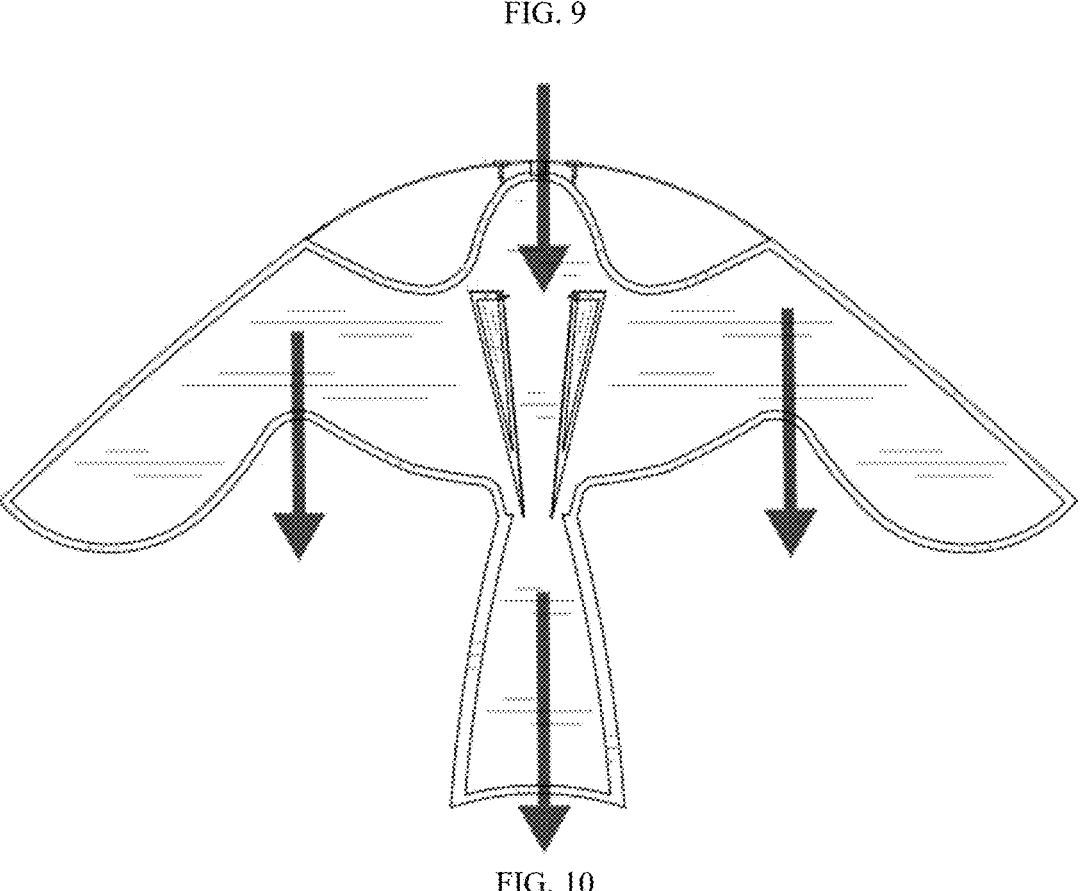
FIG. 10 is a schematic diagram of the air duct of the raptor kite of the present invention.

As shown in FIG. 4 and FIG. 5, a bionic bird repeller in this embodiment is basically the same as the first embodiment, but the difference is that the thorn cone 10 at the lower end of the pole 30 is replaced by an installation base 20, which includes a bottom plate 21 and a socket 22 fixedly connected to the bottom plate 21. The bottom plate 21 can be installed and fixed on the ground through an expansion bolt, which is suitable for hardening the ground. The lower end of the pole 30 can be inserted into the socket 22, and the socket 22 is provided with an installation bolt 23.

In other embodiments (not shown in the figure), in order to improve the stability of the device, the lower surface of the bottom plate 21 can also be equipped with anti-slip texture or bump structure, which can effectively prevent the bottom plate 21 from sliding during the operation and ensure the stability and safety of the pole 30.

In other embodiments (not shown in the figure), the lower end of the pole 30 and the socket 22 can also be connected by threads. With its excellent fastening and self-locking performance, the threaded connection can effectively resist the vibration and displacement caused by wind when encountering harsh environment such as strong wind, and ensure the close fit and stable connection between the pole 30 and the socket 22. In addition, by accurately controlling the key parameters such as thread pitch, tooth profile angle and surface treatment, the mechanical properties of the connection can be further optimized and the overall fatigue strength and durability can be improved.

Specifically, the structure of the mounting base 20 is stable and flexible, and it is composed of a bottom plate 21 and a socket 22. The edge of the bottom plate 21 is provided with a plurality of through holes for inserting the expansion bolts. With this structure, the expansion bolts can be easily and stably fixed on the hardened ground, so that the bird repeller can be butted on cement ground, slate road or other hard ground to ensure the stable standing.

The socket 22 is arranged on the bottom plate 21, which provides for the pole 30. The socket 22 is equipped with the mounting bolt 23. When the pole 30 is inserted into the socket 22, the mounting bolt 23 is inserted between the socket 22 and the pole 30, so that the tight lock between pole 30 and the socket 22 can be realized, which not only simplifies the installation steps, but also greatly enhances the firmness and reliability of the connection. This structure not only effectively prevents the pole 30 from shaking and tilting under the action of wind or external force, but also ensures the stability and safety of the bird repeller in long-term use.

Embodiment 3

The difference between Embodiment 3 and Embodiment 2 is that:

the socket 22 is obliquely arranged, and the center of the bottom plate 21 protrudes upward, thus forming a vertical assembly cavity 26 inside the bottom plate 21. The top and bottom of the assembly cavity 26 are open structures, and a bearing 25 is installed in the assembly cavity 26. The outer ring of the bearing 25 is in interference fit with the inner wall of the assembly cavity 26, and the lower opening of the assembly cavity 26 allows the bearing 25 to pass through, which is convenient for mounting and dismounting the bearing.

The bottom of the assembly cavity 26 is provided with a blocking plate 27, which is connected and fixed with the bottom plate 21 through a plurality of assembly screws. During use, the blocking plate 27 is used for supporting the bearing 25 to prevent the bearing 25 from falling off from the assembly cavity 26 under downward pressure. When installing and disassembling the bearing 25, the blocking plate 27 can be detached from the bottom plate 21, which is convenient for operation.

The bottom end of the socket 22 is vertically and fixedly connected with a rotating shaft 221, which is sleeved in the inner ring of the bearing 25, and the inner ring of the bearing 25 is threaded with a fastening screw 24 along its radial direction. By screwing the fastening screw 24 tightly, the rotating shaft 221 can be tightly locked in the inner ring of the bearing 25, so that the rotating shaft 221 can rotate in the assembly cavity 26, and it is also convenient to assemble and disassemble the rotating shaft 221 and the bearing 25.

Moreover, in this embodiment, by inclining the socket 22, the pole 30 can be kept in an inclined state, and when the orientation of the Raptor kite 60 is changed by the wind, the pole 30 and the socket 22 can be driven to rotate, thus automatically adapting to the wind direction, effectively reducing the torsion and bending force on the pole 30, preventing the pole 30 from being damaged to a great extent, and prolonging its service life, at the same time, the winding of the connecting rope 40 can be further avoided.

What is claimed is:

1. A bionic bird repeller, comprising a pole (30), a connecting rope (40), a connecting element (50) and a raptor kite (60), wherein, the raptor kite (60) comprises wing parts (61), a tail part (62) and a chest part (63), wherein there are at least one pair of wing parts (61) which are provided with concave parts (611); the concave parts are defined on a leeward side of the wing parts; a first air duct is formed inside the concave parts (611); the chest part (63) is provided with a diversion structure, and a second air duct extends from the diversion structure to the tail part (62);

the connecting element (50) is used for connecting the raptor kite (60) and the connecting rope (40), and the connecting element (50) comprises a movable mechanism for preventing twisting;

one end of the connecting rope (40) is connected to the pole (30), a rotating mechanism is arranged between the pole (30) and the connecting rope (40), and the raptor kite (60) rotates around the pole (30) by 360 degrees through the rotating mechanism;

the diversion structure comprises at least two diversion sheets (631) arranged in parallel, the at least two diversion sheets are spaced apart and arranged on the chest part, and the tail part (62) is located behind the two diversion sheets (631);

the movable mechanism comprises a second collar (51), a rotating drum (52), a rotating core (53) and a retaining ring (54), wherein the rotating drum (52) is sleeved on the second collar (51) and the rotating core (53) is rotatably connected in the rotating drum (52); the retaining ring (54) is movably connected to the rotating core (53); and two diversion sheets (631) are connected with the retaining ring (54), and another end of the connecting rope (40) is bound on the second collar (51).

2. The bionic bird repeller according to claim 1, wherein a bottom of the pole (30) is provided with a fixing device for fixing the pole (30).

3. The bionic bird repeller according to claim 2, wherein the fixing device is a thorn cone (10), the thorn cone (10) is fixedly connected with a lower end of the pole (30), and an upper end of the thorn cone (10) is fixedly connected with a support plate (11).

4. The bionic bird repeller according to claim 2, wherein the fixing device is an installation base (20), the installation base (20) comprises a bottom plate (21) and a socket (22) which are fixedly connected, and a lower end of the pole (30) is fixedly connected in the socket (22).

5. The bionic bird repeller according to claim 4, wherein an edge of the bottom plate (21) is provided with a plurality of through holes for inserting screws.

6. The bionic bird repeller according to claim 4, wherein the socket (22) is provided with a mounting bolt (23), and the mounting bolt (23) connects the socket (22) with the pole (30).

7. The bionic bird repeller according to claim 1, wherein the rotating mechanism comprises a sleeve (31) and a first collar (32), wherein the sleeve (31) is rotatably connected to a top of the pole (30); the first collar (32) is fixedly installed on a top of the sleeve (31); and the connecting rope (40) is bound on the first collar (32).

8. The bionic bird repeller according to claim 1, wherein the retaining ring (54) is a bent and closed metal strip, and both ends of the retaining ring (54) are elastically buckled on a body thereof respectively.

9. The bionic bird repeller according to claim 1, wherein the chest part comprises a sheet from which the at least two diversion sheets (631) extend.

10. The bionic bird repeller according to claim 1, wherein the at least two diversion sheets are two deflector pieces configured to gather and guide front wind to the tail part (62).

11. The bionic bird repeller according to claim 1, wherein each of the at least two diversion sheets comprises a first edge and second edge on an opposing side of the respective diversion sheet, relative to the first edge;

wherein each of the first edges are connected to the chest part;

wherein the second edge of one the at least two diversion sheets is spaced apart from the second edge of another of the at least two diversion sheets; and wherein the one the at least two diversion sheets comprises an inward-facing side that faces an inward-facing side of the another of the at least two diversion sheets.

12. A bionic bird repeller, comprising a pole (30), a connecting rope (40), a connecting element (50) and a raptor kite (60), wherein, the raptor kite (60) comprises wing parts (61), a tail part (62) and a chest part (63), wherein there are at least a pair of wing parts (61) which are provided with concave parts (611); the concave parts are defined on a leeward side of the at least a pair of wing parts; a first air duct is formed in an inner side of the concave parts, the chest part (63) is provided with at least two parallel diversion sheets (631); a second air duct is formed between the at least two parallel diversion sheets; and the at least two diversion sheets are spaced part arranged on the chest part;

the connecting element (50) is used for connecting the raptor kite (60) and the connecting rope (40), and comprises a movable mechanism for preventing twisting, wherein the movable mechanism comprises a rotating drum (52) and a rotating core (53), and the rotating core (53) is rotatably connected in the rotating drum (52);

one end of the connecting rope (40) is connected to the pole (30), a rotating mechanism is arranged between the pole (30) and the connecting rope (40), and the raptor kite (60) rotates around the pole (30) by 360 degrees through the rotating mechanism; and the at least two parallel diversion sheets (631) are connected to each other by the movable mechanism.

13. The bionic bird repeller according to claim 12, wherein the tail part (62) is located at a rear part between the two diversion sheets (631).

14. The bionic bird repeller according to claim 12, wherein the rotating mechanism comprises a sleeve (31) and a first collar (32), wherein the sleeve (31) is rotatably connected to a top of the pole (30), and the first collar (32) is fixedly installed on a top of the sleeve (31); and the connecting rope (42) is bound on the first collar (32).

15. The bionic bird repeller according to claim 12, wherein the pole (30) is a telescopic pole composed of a plurality of poles which are sequentially sleeved.

16. The bionic bird repeller according to claim 12, wherein the pole (30) is made of a high-toughness material, and the connecting rope (40) is a nylon rope.

17. The bionic bird repeller according to claim 12, wherein the chest part comprises a sheet from which the at least two parallel diversion sheets (631) extend.

18. A bionic bird repeller, comprising a pole (30), a connecting rope (40), a connecting element (50) and a raptor kite (60), wherein, the raptor kite (60) comprises wing parts (61), a tail part (62) and a chest part (63), wherein there are at least a pair of wing parts (61) which are provided with concave parts (611); the concave parts are defined on a leeward side of the at least a pair of wing parts; a first air duct is formed in an inner side of the concave parts, the chest part (63) is provided with at least two parallel diversion sheets (631); a second air duct is formed between the at least two parallel diversion sheets; and the at least two diversion sheets are spaced part arranged on the chest part;

the connecting element (50) is used for connecting the raptor kite (60) and the connecting rope (40), and comprises a movable mechanism for preventing twisting, wherein the movable mechanism comprises a rotating drum (52) and a rotating core (53), and the rotating core (53) is rotatably connected in the rotating drum (52);

one end of the connecting rope (40) is connected to the pole (30), a rotating mechanism is arranged between the pole (30) and the connecting rope (40), and the raptor kite (60) rotates around the pole (30) by 360 degrees through the rotating mechanism;

the tail part (62) is located at a rear part between the two diversion sheets (631); and the movable mechanism further comprises a second collar (51) and a retaining ring (54), the rotating drum (52) is sleeved on the second collar (51), and the retaining ring (54) is movably connected to the rotating core (53);

wherein, two diversion sheets (631) are connected with the retaining ring (54), and another end of the connecting rope (40) is bound on the second collar (51).

* * * * *